United States Patent
Baca et al.

(10) Patent No.: US 10,349,207 B2
(45) Date of Patent: *Jul. 9, 2019

(54) MOBILE GEO-FENCE SYSTEM

(71) Applicant: Intel Corporation, Santa Clara, CA (US)

(72) Inventors: Jim S. Baca, Corrales, NM (US); David Stanasolovich, Beaverton, OR (US); Tobias Kohlenberg, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/889,257

(22) Filed: Feb. 6, 2018

(65) Prior Publication Data

US 2018/0227700 A1     Aug. 9, 2018

Related U.S. Application Data

(63) Continuation of application No. 14/922,988, filed on Oct. 26, 2015, now Pat. No. 9,918,191.

(51) Int. Cl.
*H04W 4/02* (2018.01)
*H04M 1/725* (2006.01)
(Continued)

(52) U.S. Cl.
CPC ........... *H04W 4/021* (2013.01); *H04W 4/025* (2013.01); *H04W 4/029* (2018.02); *G06Q 50/01* (2013.01);
(Continued)

(58) Field of Classification Search
CPC ......... H04W 4/021; H04W 4/02; H04W 4/21; H04W 4/029; H04W 64/00; H04W 12/08; H04W 12/06; H04W 48/02; H04W 4/023; H04W 4/025; H04W 4/18; H04W 4/022; H04W 4/027; H04W 4/08; H04W 4/12; H04L 67/18; H04L 67/306; H04L 67/22; H04L 51/20; H04L 51/32; G06Q 50/01;
(Continued)

(56) References Cited

U.S. PATENT DOCUMENTS 7,026,983 B2    4/2006 Spratt
8,577,590 B2    11/2013 Doyle
(Continued)

FOREIGN PATENT DOCUMENTS

WO    2015077745    5/2015

OTHER PUBLICATIONS

International Searching Authority, "Notification of Transmittal of the International Search Report and the Written Opinion of the International Searching Authority," dated Dec. 22, 2016, in International application No. PCT/US2016/051298.

*Primary Examiner* — Olumide Ajibade Akonai
(74) *Attorney, Agent, or Firm* — Trop, Pruner & Hu, P.C.

(57) ABSTRACT

Various systems and methods for a mobile geo-fence system are described herein. A system for managing mobile geo-fences includes a tracking module to track a mobile geo-fence, the mobile geo-fence corresponding to a mobile device; a detection module to detect an intersection of the mobile geo-fence with a second geo-fence; and a data transmission module to provide data to the mobile device based on a data sharing policy.

19 Claims, 8 Drawing Sheets

(51) Int. Cl.
*H04W 4/021* (2018.01)
*H04W 64/00* (2009.01)
*H04W 4/029* (2018.01)
*G06Q 50/00* (2012.01)
*H04W 4/08* (2009.01)

(52) U.S. Cl.
CPC ........ *H04M 1/72572* (2013.01); *H04W 4/023* (2013.01); *H04W 4/027* (2013.01); *H04W 4/08* (2013.01); *H04W 64/00* (2013.01)

(58) Field of Classification Search
CPC .......... G06Q 30/0261; G06Q 30/0269; H04M 1/72572
See application file for complete search history.

(56) References Cited

U.S. PATENT DOCUMENTS

| | | | |
|---|---|---|---|
| 9,066,464 B2 | 6/2015 | Schmidt | |
| 9,674,658 B2 | 6/2017 | Partheesh | |
| 2007/0237096 A1* | 10/2007 | Vengroff | H04W 4/029 370/254 |
| 2009/0140886 A1* | 6/2009 | Bender | B60R 25/00 340/988 |
| 2010/0279713 A1* | 11/2010 | Dicke | H04M 1/72572 455/457 |
| 2011/0178811 A1 | 7/2011 | Sheridan | |
| 2011/0179064 A1* | 7/2011 | Russo | G06Q 10/10 707/769 |
| 2012/0008526 A1 | 1/2012 | Borghei et al. | |
| 2012/0172027 A1* | 7/2012 | Partheesh | H04W 4/021 455/420 |
| 2012/0290638 A1* | 11/2012 | Narula | G06Q 10/10 709/203 |
| 2013/0099920 A1 | 4/2013 | Song et al. | |
| 2013/0117266 A1 | 5/2013 | Yahalom et al. | |
| 2014/0045516 A1 | 2/2014 | Turgman | |
| 2014/0162692 A1 | 6/2014 | Li et al. | |
| 2014/0337123 A1 | 11/2014 | Nuernberg | |
| 2015/0141037 A1 | 5/2015 | Saha | |
| 2015/0141038 A1* | 5/2015 | Meredith | H04W 4/021 455/456.1 |
| 2016/0063189 A1 | 3/2016 | Soon-Shiong | |
| 2016/0116274 A1* | 4/2016 | Meredith | H04W 4/029 702/150 |
| 2016/0350564 A1 | 12/2016 | Nedelcu | |
| 2016/0364547 A1 | 12/2016 | Love | |

\* cited by examiner

MOBILE GEO-FENCE SYSTEM

This application is a continuation of U.S. patent application Ser. No. 14/922,988, filed Oct. 26, 2015, the content of which is hereby incorporated by reference

TECHNICAL FIELD

Embodiments described herein generally relate to location tracking systems and in particular, to a mobile geo-fence system.

BACKGROUND

The widespread availability of multi-functional mobile devices has resulted in having these devices as an integral medium for everyday activities. Mobile devices are capable of displaying maps, using position sensing technologies (e.g., global positioning system (GPS)), and providing alerts via text, graphics, audio, and the like.

A geo-fence is a virtual boundary around a geographic location. When a location-aware mobile device enters or exits a geo-fenced area, various actions may occur, such as presenting a notification on the mobile device. Geo-fences are used in a variety of applications, including security, insurance, and recreation.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Systems and methods described herein provide mobile geo-fences. Geo-fences may be created that are centered on a mobile device, rather than on a stationary location. When the mobile device moves, so does the geo-fence. Mobile geo-fences are useful, for example, to provide dynamic notifications when someone or something enters or exits the mobile geo-fence. Multiple mobile geo-fences may be implemented and their intersections may be detected causing an event. Notification of the event may be provided to one or more people.

One useful technology for location-based applications is geo-fencing. Geo-fencing includes creating and managing a geo-fence, which is a virtual boundary of a geographical area. A geo-fence may be considered an object (e.g., a geo-fence object), such that the geo-fence may have various properties like objects in other disciplines, such as object-oriented programming. In this way, a geo-fence object may include attributes and functions.

Attributes may include data, such as a name, unique identifier, coordinates defining the geo-fence (e.g., a latitude/longitude or a relative coordinate system), an active and expiration date/time, permissions, and the like. Functions may include actions such as notifications on entry/exit of a geo-fence, application download or initiation upon entry/exit, or other actions that occur on a user's mobile device or are caused to occur on another device associated with the user or on another user's device.

For example, a mobile geo-fence may have attributes such as a name, "John's Mobile Geo-Fence" and an area centered on John's mobile device. The mobile geo-fence may use a defined active state, such as beginning midnight, May 25, 2013 and expiring midnight, May 28, 2013. The "John's Mobile Geo-Fence" geo-fence may have functions associated with it such that when a user enters the geo-fence a notification is pushed to the user's device. Other functions and abilities are discussed below.

Figure 1:
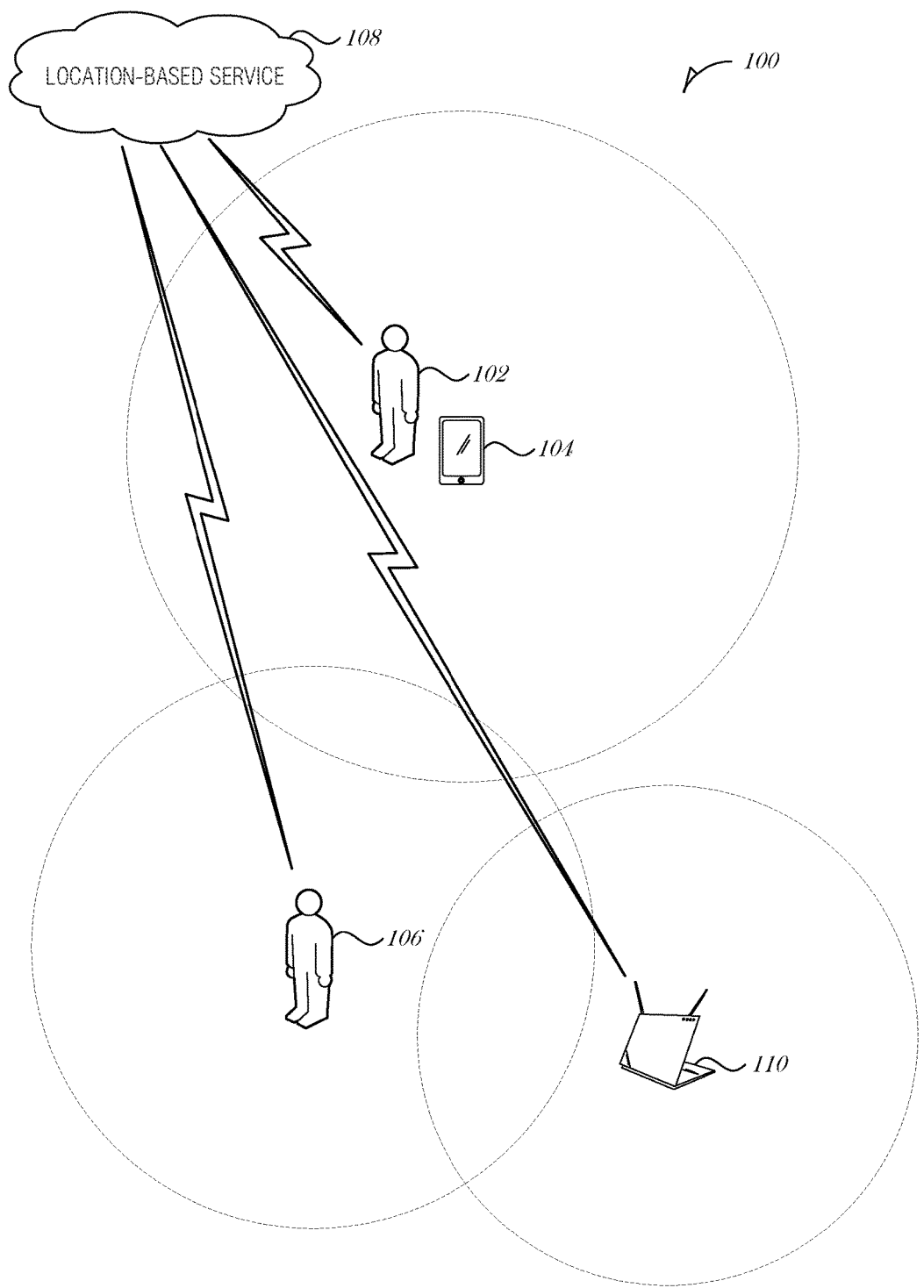
FIG. 1 is a diagram illustrating an operating environment, according to an embodiment.

FIG. 1 is a diagram illustrating an operating environment 100, according to an embodiment. In the operating environment 100, a user 102 has a mobile device 104. The mobile device 104 may be any type of compute device including, but not limited to a laptop, tablet, phablet, hybrid device, wearable device, or the like. The mobile device 104 provides the mobile device 104 a geo-fence (illustrated with dashed circle on mobile device 104). Additionally, a second user 106 is in the operating environment 100 and is wearing a wearable device, such as a smart bracelet (not shown). The geo-fence for the second user 106 is illustrated by the dashed circle on the second user 106.

Each of the mobile device 104 and the second user 106 may be communicatively linked to a location-based service 108. The location-based service 108 may be executing from a server in the same building as the users or may be executing from a remote location, such as a cloud service. Alternatively, the location-based service 108 may execute from one or several user devices in the operating environment 100.

The operating environment 100 includes a stationary device, such as an access point 110, which is capable of providing another geo-fence. The access point 110 provides a stationary geo-fence illustrated by the dashed circle centered on the access point 110.

The geo-fences illustrated in FIG. 1 may operate in one of two modes. In a first mode, the geo-fence is configured to provide a notification to a user or device that enters or exits the geo-fence. Additionally, the geo-fence may also log the entrance or exit of the user or device from its geo-fence.

In another mode, the device providing the geo-fence is configured such that the device detects the intersection of its geo-fence with another geo-fence. For example, the access point 110 may detect the intersection of its geo-fence with that of the second user 106. When geo-fences intersect, actions may result, such as a notification, an application installation, or the like. Notifications, advertisements, or other content may be served from the location-based service 108.

In either mode, the creation and management of the geo-fence may be performed at the location-based service 108. For example, the second user 106 may register a personal geo-fence for the wearable device, name the geo-fence, define its size and shape (e.g., by providing one or more coordinates), determine actions that occur when a person or object enters or exits the geo-fence, and determine when the geo-fence is active. Creating a circular geo-fence may be done with a single coordinate either in two-dimensional space or three-dimensional space, and a radius (measured in meters, feet, or whatever units the location-based service 108 supports). Creating polygon geo-fences may be done with three or more coordinates. Thus, the second user 106 may create regular or irregular shapes for the effective geo-fence. Coordinates may be relative to the device or absolute positions. Coordinates and locations of devices may be determined using various location methods, such as by using global positioning system (GPS) coordinates, Wi-Fi trilateration, Bluetooth trilateration, or combinations of these.

The geographical location may be determined at the device (e.g., the mobile device 104). Geographical location may be determined in various ways including Global Positioning Systems (GPS), assisted GPS, cellular trilateration, or Wi-Fi trilateration. The result of such positioning systems may be reduced to a latitude/longitude pair. Thus, in an embodiment, the geographical location includes latitude and longitude coordinates.

The location-based service 108 provides a geo-fence service to one or more devices that register geo-fences. Other devices may query the location-based service 108 to determine whether they have entered, exited, or intersected a geo-fence. The location-based service 108 may serve the appropriate content or perform the associated action with a geo-fence when a device triggers the action. Location-aware systems and applications may periodically query the location-based service 108 to determine whether any geo-fences exist and then interact with the geo-fences in the manner described. For example, to determine whether a device has entered a geo-fenced area or whether its geo-fence has intersected another geo-fence, the device may communicate with the location-based service 108 to transmit its geographical location to the location-based service 108 and receive an indication from the location-based service 108 that the mobile device 104 is in the geo-fenced area or intersects another geo-fence.

To detect the intersection of geo-fences, the location of the devices with geo-fences and the shapes of the geo-fences are monitored by the location-based service 108. For example, the access point 110 may be configured to use a 50 foot radius as its geo-fenced area. The second user 106 may configure the wearable device's geo-fence at 80 feet. As a result, the location-based service 108 may determine that the geo-fences of the second user 106 and the access point 110 intersect when the two are less than 130 feet away from each other.

Figure 2:
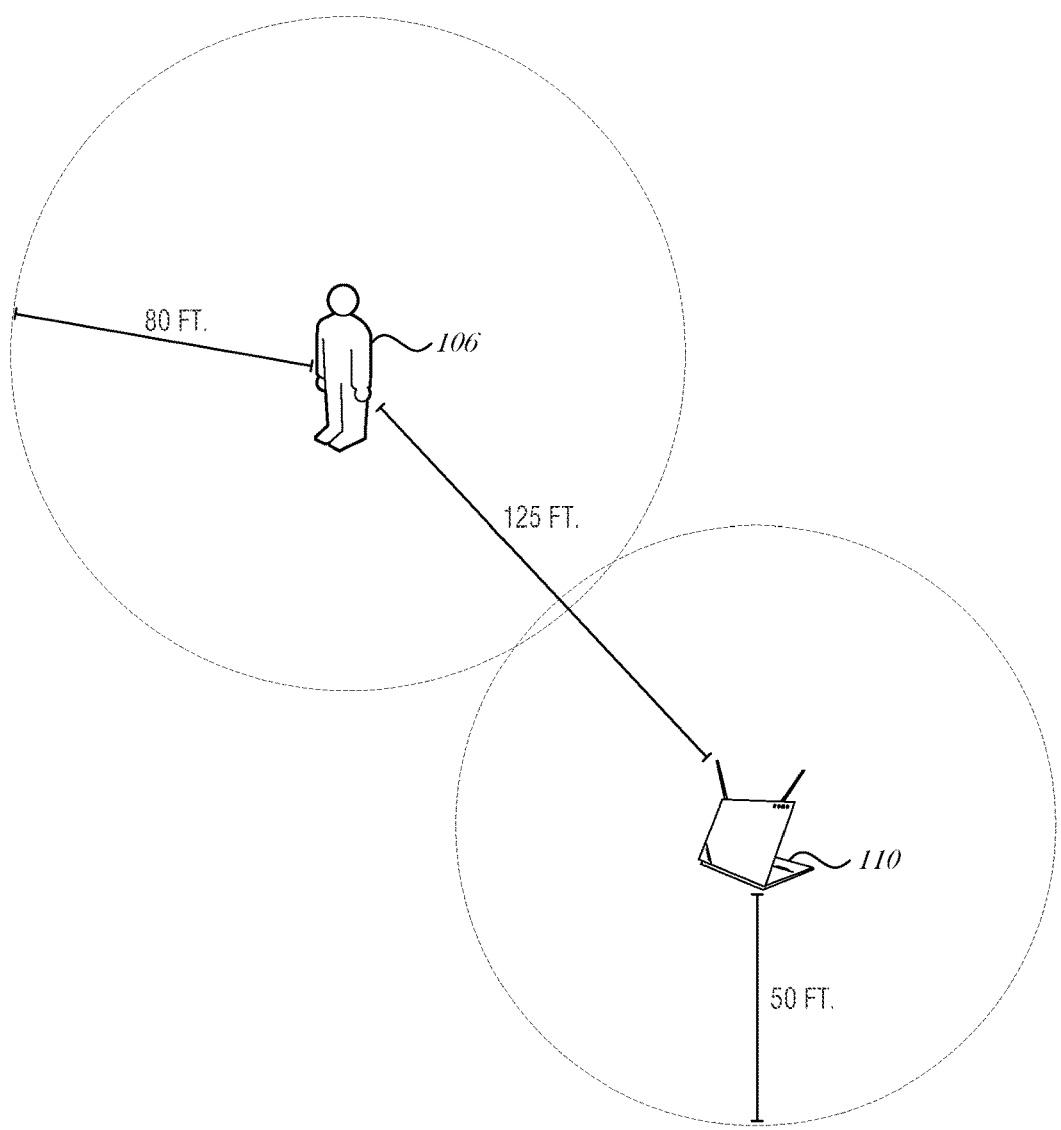
FIG. 2 is an example of geo-fence intersections, according to an embodiment.

FIG. 2 is an example of geo-fence intersections, according to an embodiment. In FIG. 2, the two geo-fences are circular (or spherical). The intersection is determined when the two devices (worn device of second user 106 and access point 110) are less than the combined side of the respective geo-fences.

Figure 3:
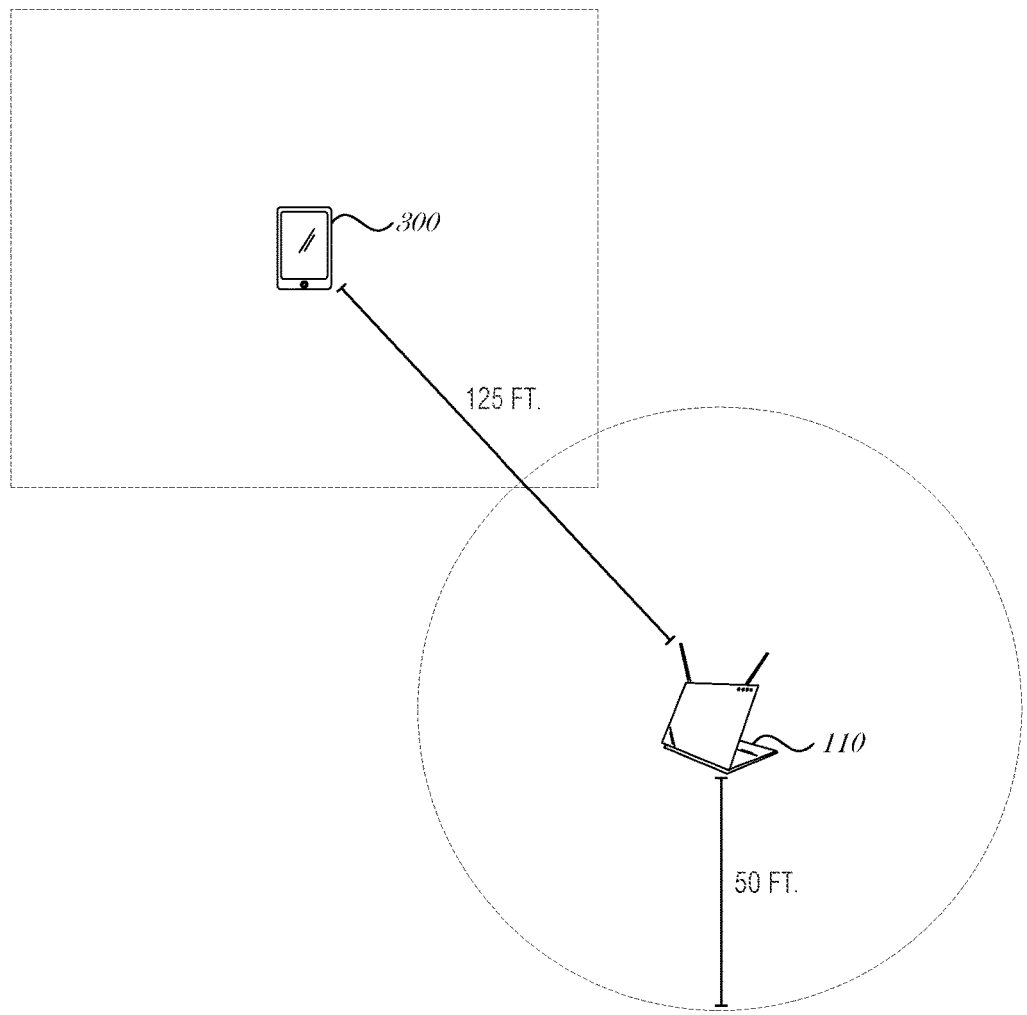
FIG. 3 is another example of geo-fence intersections, according to an embodiment.

FIG. 3 is another example of geo-fence intersections, according to an embodiment. In this case, the geo-fence created around a device 300 is rectangular. The location-based service 108 may model the geo-fences of the device 300 and the access point 110 to determine when two geo-fences intersect. This may be performed using any technique including geometric and trigonometric operations.

Returning to FIG. 1, the devices that take action based on geo-fences (e.g., mobile device 104) may be passive devices or active devices. As a passive device, the device receives notifications, applications, or other data from the location-based service 108 and presents it to a user. Examples of passive devices include a wristband device with a light-emitting diode (LED) display. The wristband device may not provide any input mechanisms directly. To program the wristband device, another device paired to the wristband device (e.g., over a Bluetooth connection) may set preferences and operational functions.

As an active device, the device may receive notifications, applications, or other data like a passive device, but the user may also be able to provide feedback using one or more input mechanisms. For example, the mobile device 104 may be a tablet computer. When the user 102 enters or intersects with the geo-fence of second user 106, the mobile device 104 may provide a notification stating the person provides a service (e.g., an electrician) and the notification may provide a mechanism to contact the second user 106 (e.g., send an email or text message). Thus, if the user 102 is in need of a plumber, then user 102 may use one or more controls on a user interface of the mobile device 104 to compose a text message asking for a quote for a job.

The location-based service 108 maintains data regarding the geo-fences and policies of geo-fences. Continuing with the example from above, the location-based service 108 may maintain one or more advertisements of the second user 106 for plumbing services. When another person's geo-fence intersects with the second user 106, the other person may be served an advertisement. The advertisement may be passive or interactive. The location-based service 108 may maintain records of the types of devices (e.g., active or passive, wearable, tablet, etc.) that have geo-fences associated with them and pass the appropriate advertisement accordingly.

Geo-fence notifications are understood to include alerts, notifications, queries, or other prompts that are provide to a user via a user device. The notifications may be communicated with audio, visual, tactile (e.g., vibration), or combinations thereof. Many mobile devices include a notification interface, such as a drop down screen that includes pending or unacknowledged notifications (e.g., notifications in queue).

In addition to geo-fence notifications that provide information, a geo-fence notification may also provide a mechanism to download, install, or launch an application. The application may be stored local to the user device or remote from the user device. The mechanism to download, install, or launch the application may include use of a hyperlink, remote procedure call, or other mechanism to initiate the download, installation, or execution. Once an application is available on a user device, it may be accessed in the same manner as other applications on the device.

Figure 4:
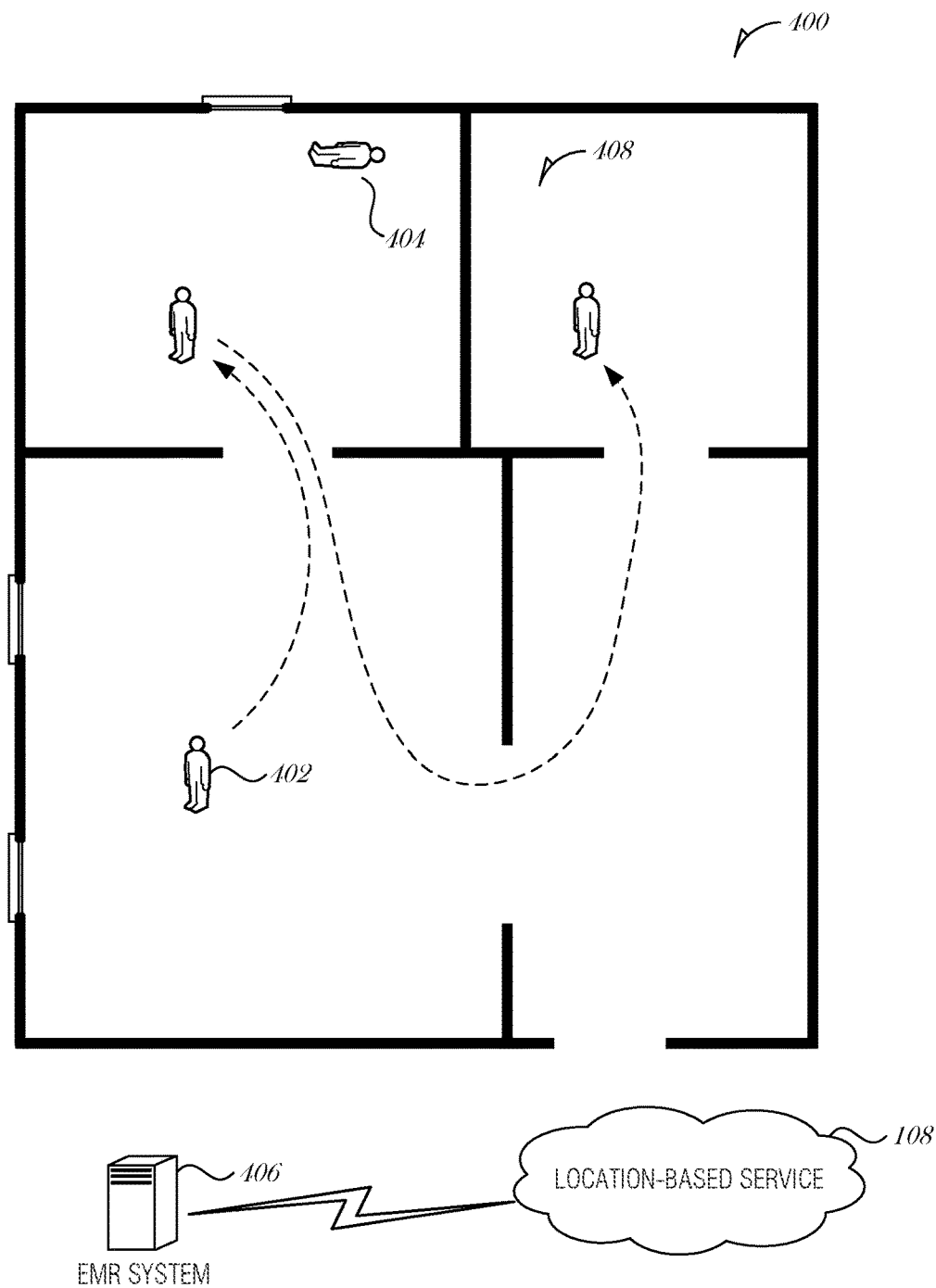
FIG. 4 is a diagram illustrating an operating environment, according to an embodiment.

FIG. 4 is a diagram illustrating an operating environment 400, according to an embodiment. In the example illustrated in FIG. 4, the operating environment 400 is a hospital. A doctor 402 may make rounds with her patients. A patient 404 is given a wearable device (e.g., a smart bracelet) upon admission to the hospital. The wearable device may interface with a location-based service 108 that keeps track of the wearable device's location. The location-based service 108 may interface with an electronic medical records (EMR)

system 406. The EMR system 406 stores digital versions of patient charts. The EMR system 406 provides a real-time, patient-centered record that makes information available instantly and securely to authorized users. The EMR system 406 may include patient medical history, diagnoses, medications, treatment plans, immunization dates, allergies, radiology images, laboratory and test results, physician notes, patient population studies, analysis tools and outcomes, patient models, and the like.

When the doctor 402 enters the room of a patient 404, the tablet used by the doctor 402 may be populated with information from the EMR system 406 regarding the patient 404. A wall display or other stationary system may be configured to display patient information, test results, medication information, and the like. The tablet or other device may dynamically display information according to a configurable setting, such as set by doctor 402 or by a system administrator. For example, new information may be highlighted to expedite the patient visit.

As an example, the doctor 402 may walk into the patient's room (he is recovering from surgery on a severely broken wrist). As she nears the patient's bed, she and her tablet device enter into proximity of the geo-fence that has been created around the patient 404. The geo-fence may be provided by any device on, near, or implanted in the patient 404. For example, a tiny quark device embedded in a patient wrist band may be used to maintain the geo-fence and using trilateration, the Wi-Fi in the room has a location of the wrist band. Automatically, her tablet brings up the patient's records including his x-rays and she discusses the success of the surgery and shows the before and after x-rays to the patient 404. The doctor 402 may take a few notes as to how the patient 404 is feeling, tells him what to expect next, etc. and walk off to visit her next patient. As she does so, all of her notes about the patient 404 are saved to the cloud and a copy is stored on the patient's bracelet and the apps on her device displaying them are reset automatically.

As the doctor 402 walks into the next patient's room, she finds that the next patient is not there. The doctor's tablet informs her that the patient is just down the hall and around the bend. As the doctor 402 enters the geo-fence around the next patient (who had a spinal fusion a couple of days ago), all of the next patient's specific records and apps that apply to her case are opened automatically on the doctor's tablet. The doctor 402 sees that this patient is still in a lot of pain and increases her pain medication on the tablet. The doctor 402 takes a few notes and leaves the patient's side to continue on with her rounds (all of the patient's records and specific apps close automatically).

Later in the day, the doctor 402 finally finishes her rounds and goes to a shared office area to relax and transcribe all of her patient notes. Since her patient notes were all captured digitally and stored in the cloud she is able to quickly pull the data back to her tablet, capture those bits of information that are important for each patient, and transcribe them into the appropriate systems which are opened automatically to the particular patient based on the data that she collects. The doctor 402 places her tablet in a bin for it to recharge and for another doctor to possibly utilize on the night shift.

In addition to the doctor's devices dynamically changing, the patient's wearable device may also perform actions based on the presence of the doctor 402 and her device. For example, the patient's wearable device may log the physician's visit, changes to medicine or treatment, orders for additional tests, and other physician notes. Similar activities may be performed by nurses, aides, or other people that visit or attend to the patient 404.

Geo-fences may be used to define areas around a person or a place. For example, when the doctor 402 enters a surgical theater 408, the tools and medication required are listed and shown to the doctor 402 and other personnel in the surgical theater 408 to enable standard medical checklists.

Figure 5:
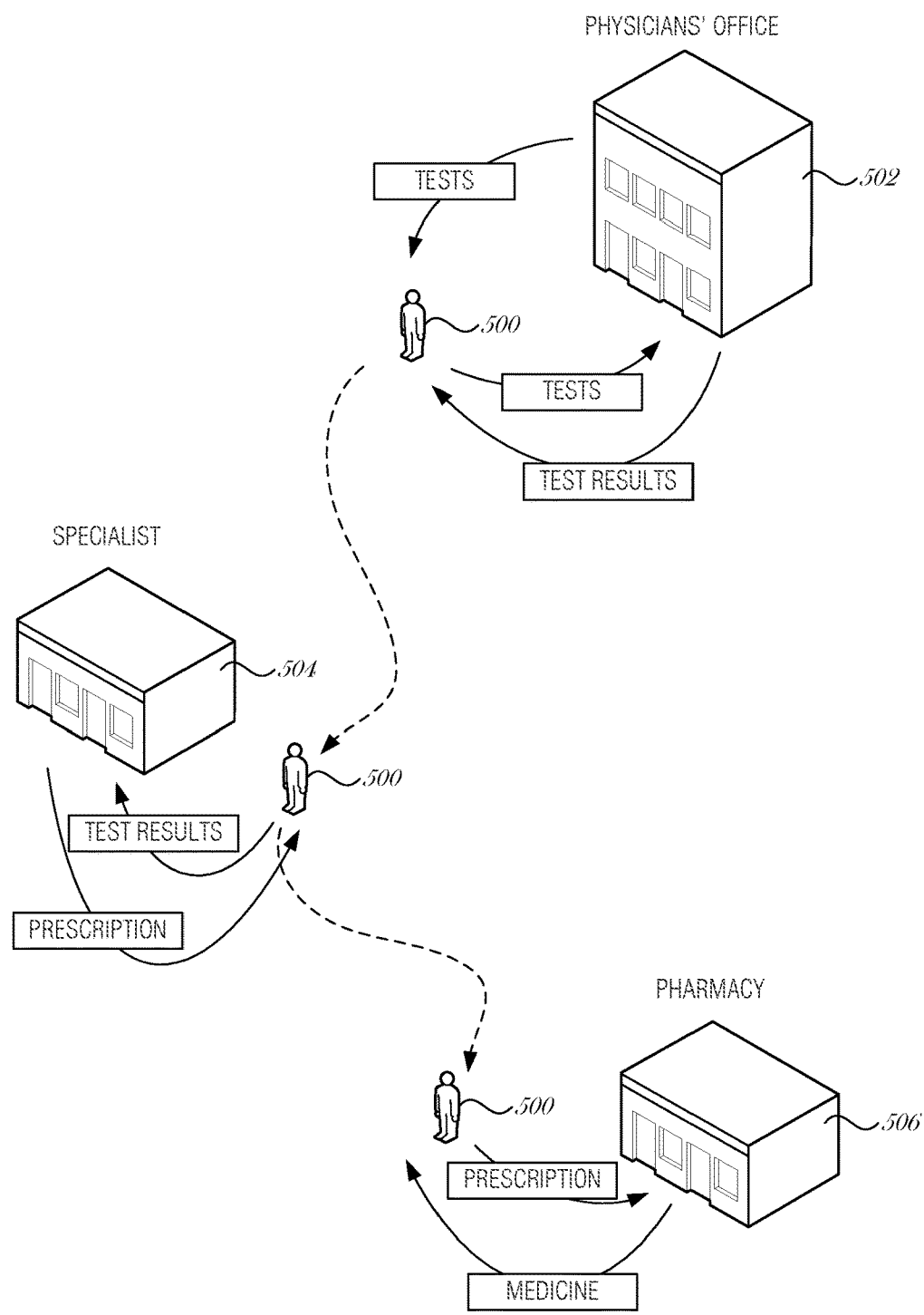
FIG. 5 is an illustration of a patient medical workflow, according to an embodiment.

Another example is illustrated in FIG. 5. A patient 500 is a patient of a doctor at a physicians' office 502. When the patient 500 arrives at the physicians' office 502, she is given a smart bracelet to wear during her testing. If the smart bracelet is removed it is automatically wiped of her personal data. During her testing, the doctor observes a specific marker in a blood test that concerns him. He prescribes a biopsy and a bone scan and refers the patient 500 to a specialist 504. The prescribed tests are loaded onto the smart bracelet.

The patient 500 may visit a laboratory at the physicians' office 502 to have the tests performed. The laboratory may query the patient's bracelet to obtain requested test, testing parameters, or to confirm the patient's identity. After the tests are performed, the results are loaded onto the smart bracelet (along with being uploaded to the EMR system at the physicians' office 502).

When the patient 500 goes to the specialist 504 her smart bracelet communicates with the system onsite at the specialist 504. The system at the specialist 504 may confirm that the patient 500 is the correct person, verify that the tests were performed, obtain test results, and other information. When the specialist 504 meets with the patient 500, the patient's most recent information, test results, medical history, and other information is available for review. The specialist 504 may prescribe medicine for the patient 500.

On the way home from the specialist 504, the patient 500 may visit a pharmacy 506 to fulfill the prescription. As she approaches the pharmacy 506, the pharmacy's geo-fence detects her and begin preparing the prescription. Her smart bracelet allows automatic authorization for the prescription, allowing the patient 500 to pick up the prescription without extra paperwork for payment, signatures, or the like.

When the patient 500 arrive home and removes the smart bracelet, the personal data stored on the smart bracelet is destroyed to provide data security.

While some examples embodiments are described in the context of healthcare, it is understood that personal geo-fences may be used in corporate setting, a school setting, or other settings. For example, in a corporate setting, when a person is within a certain proximity to another person, then certain information may be available such as project files, personnel review files, or the like. In a school setting, teachers and students may all have personal devices (e.g., wearable devices) with geo-fences. When a teacher approaches a student, the student's test scores may appear on the teacher's device, and the teacher's assignments may be downloaded to the student's device. In a home setting, parents and children may use personal devices, and the child may only be able to access the school's homework system when the parent is present (e.g., within the child's geo-fence), thereby encouraging parental involvement in homework and allowing the parent to verify that the child is actually doing homework on the computer rather than playing games.

Figure 6:
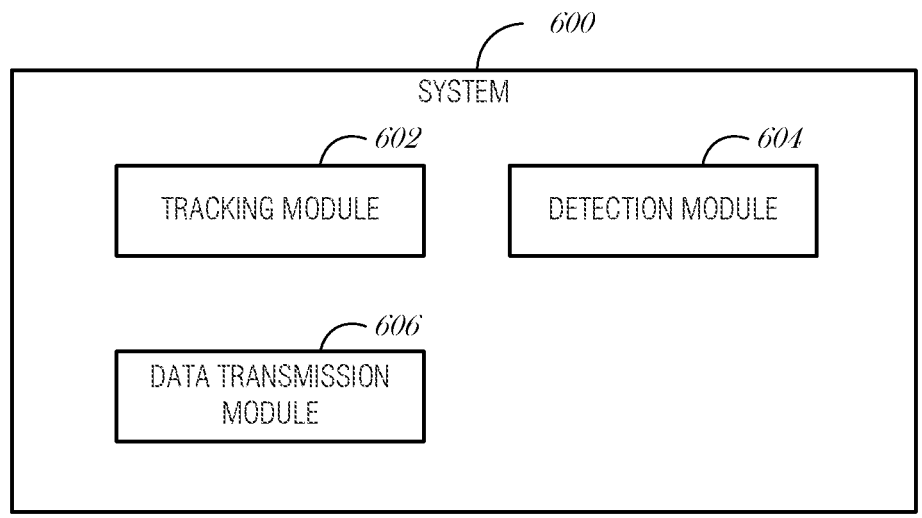
FIG. 6 is a block diagram illustrating a system for managing mobile geo-fences, according to an embodiment.

FIG. 6 is a block diagram illustrating a system 600 for managing mobile geo-fences, according to an embodiment. The system 600 includes a tracking module 602, a detection module 604, and a data transmission module 606. In an embodiment, the system 600 is a cloud-based service.

The tracking module 602 may be configured to track a mobile geo-fence, the mobile geo-fence corresponding to a mobile device. When a user begins use of the mobile device, such as when the user is first hired at a company, a geo-fence may be defined and registered to the user. The geo-fence may be defined by its size, duration, active times, notification policies, and the like. Some or all of these parameters may be user-defined or controlled. In an embodiment, the system 600 includes a registration module to receive a registration of the mobile geo-fence, the registration including geo-fence parameters. In a further embodiment, the geo-fence parameters include a geo-fence shape and size. In another embodiment, the geo-fence parameters include an identity of a user of the mobile device.

In various embodiments, the mobile geo-fence is a polygonal shape, a circular shape, or a three-dimensional shape. The mobile geo-fence may be any shape definable using one or more geolocations. For example, to define a polygonal shape, a set of geolocations may be used to identify the vertices of the polygon in two-dimensional space. Alternative, vectors (e.g., direction and distance) may be used to define the vertices. Combinations of geolocations and vectors may be used as well. Defining a circular shaped geo-fence may be performed using a single geolocation and a distance as the radius. A three-dimensional spherical geo-fence may be defined similarly. The second geo-fence may be of similar shapes and also be defined in a similar manner.

The detection module 604 may be configured to detect an intersection of the mobile geo-fence with a second geo-fence. In an embodiment, to detect the intersection of the mobile geo-fence with the second geo-fence further, the detection module 604 is to identify a boundary of the mobile geo-fence, identify a boundary of the second geo-fence, and determine whether the boundary of the mobile geo-fence overlaps at least a portion of the boundary of the second geo-fence. The boundaries of the mobile geo-fence and the second geo-fence are determined by the parameters of the geo-fences. In the case of the mobile geo-fence, the boundaries may be relative to the mobile device's current location. When the second geo-fence is defined on a stationary device, the second geo-fence may be defined using absolute coordinates (e.g., latitude-longitude coordinates), or relative coordinates from the stationary device's location. When the second geo-fence is defined on a mobile device, then relative location values may be used based off of the mobile device's location.

In a further embodiment, to determine whether the boundary of the mobile geo-fence overlaps at least a portion of the boundary of the second geo-fence further, the detection module 604 is to determine that the boundary of the mobile geo-fence overlaps at least a portion of the boundary of the second geo-fence without the mobile device being in the second geo-fence. As described above, geo-fence intersections may occur before either device is in the other's geo-fence.

The data transmission module 606 may be configured to provide data to the mobile device based on a data sharing policy. Communication between the mobile device and the system 600 may be encrypted to ensure that sensitive data is not exposed. Various types of encryption may be used including, but not limited to public-key infrastructure (PKI) mechanisms (e.g., asymmetric cryptography), private key mechanisms (e.g., symmetric cryptography), and hashing mechanisms (e.g., Message Digest 5 (MD5) and Secure Hashing Algorithm (SHA)). Other specific mechanisms include Hypertext Transfer Protocol Secure (HTTPS) and Pretty Good Privacy (PGP). It is understood that other mechanism to encrypt or secure communications may be used. Thus, in an embodiment, the data is encrypted.

In an embodiment, to provide data to the mobile device, the data transmission module 606 is to determine an identity of a user of the mobile device, determine an identity associated with the second geo-fence, and access the data sharing policy that links the identity of the user with the identity associated with the second geo-fence. Examples of paired identities include, but are not limited to doctor-patient, husband-wife, parent-child, teacher-student, and the like.

In an embodiment, the second geo-fence is that of a patient, and to provide data to the mobile device, the data transmission module 606 is to access an electronic medical records database, identify patient data of the patient associated with the second geo-fence, and provide the patient data to the mobile device. The geo-fences may be registered with the system 600 so that looking up who is associated with the geo-fences that have intersected is straightforward. Consent may be obtained to allow the system 600 to access patient records and provide them to the physician or clinician on behalf of the patient. After a clinician-patient interaction, the clinician may update the patient record to order tests, change medicine, or the like. Thus, in an embodiment, the system 600 includes a data storage module to receive data from the mobile device and communicate the data to the electronic medical records database for storage.

After the physician has completed the patient interaction and leaves the room, the physician may no longer need data on the mobile device regarding the patient. Thus, in an embodiment, the system 600 includes a data deletion module to transmit a trigger action that erases the data from the mobile device after detecting that the mobile geo-fence and the second geo-fence no longer intersect.

In an embodiment, the second geo-fence is a stationary geo-fence. For example, the second geo-fence may be situated around an examination room in a hospital, an observation room in a jail, a pharmacy, a school classroom, or the like. Thus, in an embodiment, the second geo-fence is associated with a room in a building.

In an embodiment, to provide data to the mobile device based on the data sharing policy, the data transmission module 606 is to determine a state of progress in a process of a user of the mobile device and load data to the mobile device from the geo-fence server based on the state. The user may be a patient going through medical evaluation or diagnosis. The user may be a student participating in a school project. The user may be an arrestee going through processing for a crime. Other examples abound. In an embodiment, the process is a medical treatment and wherein the state of progress is a stage in the medical treatment. In a further embodiment, the stage of the medical evaluation comprises a laboratory test stage. In another embodiment, the stage of the medical evaluation comprises a diagnostic stage. In another embodiment, the stage of the medical evaluation comprises a physical examination stage. In another embodiment, the stage of the medical evaluation comprises a surgical operation stage.

When the geo-fences intersect, information may be shared bi-directionally. For example, the physician may receive information about the patient (e.g., a patient record) and the patient may receive information about the physician (e.g., logging the physician's visit on a smart bracelet). Thus, in an embodiment, the system 600 includes a data sharing module to provide information to a device corresponding to the second geo-fence, the second geo-fence defined in part by being centered on the device, the information related to a user of the mobile device. In a further embodiment, the information is related to a medical treatment being provided by a clinician, the clinician being the user of the mobile device. In an embodiment, the information comprises patient chart data.

Figure 7:
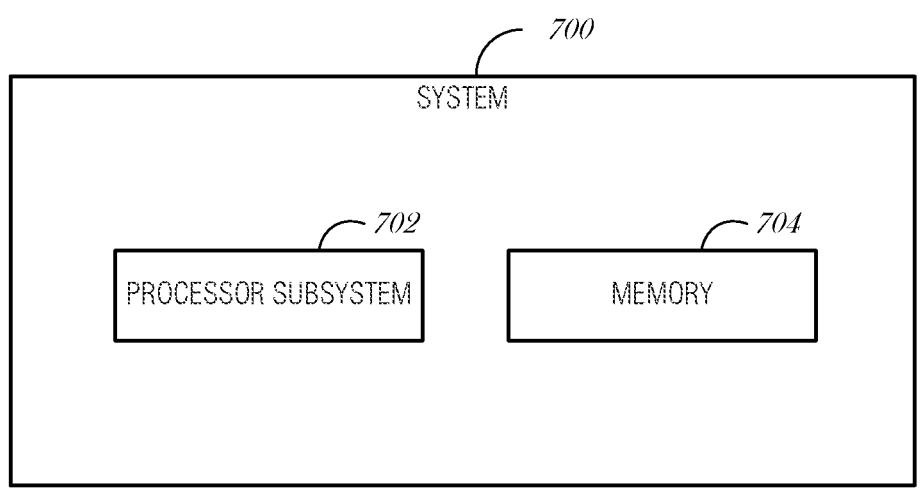
FIG. 7 is a block diagram illustrating a system for managing mobile geo-fences, according to an embodiment.

FIG. 7 is a block diagram illustrating a system 700 for managing mobile geo-fences, according to an embodiment. The system 700 includes a processor subsystem 702 and a memory 704 including instructions, which when executed by the processor subsystem, cause the processor subsystem to perform the operations described in this document with respect to FIGS. 6 and 8. The processor subsystem 702 may include one or more processors, each with one or more cores. Additionally, the processor subsystem 702 may be disposed on one or more physical devices.

Figure 8:
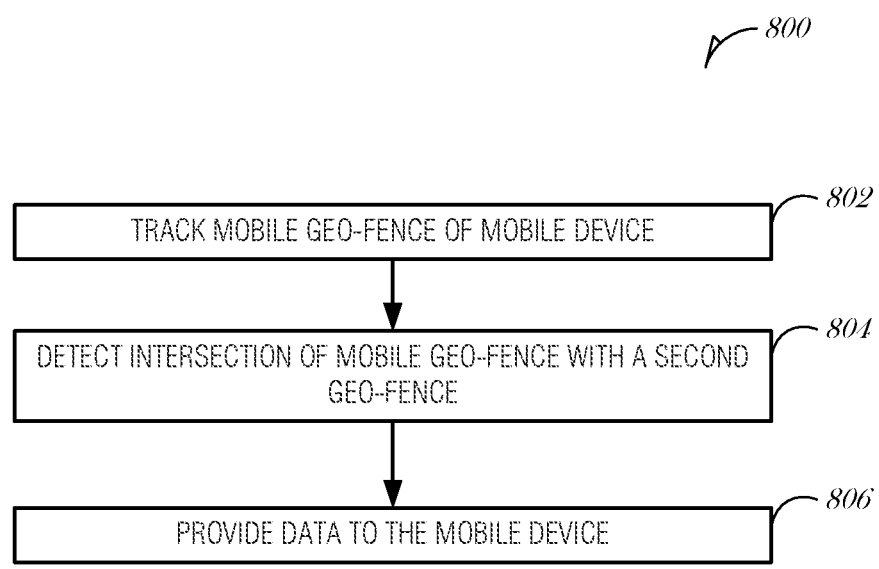
FIG. 8 is a flowchart illustrating a method of managing mobile geo-fences, according to an embodiment.

FIG. 8 is a flowchart illustrating a method 800 of managing mobile geo-fences, according to an embodiment. At 802, a mobile geo-fence is tracked at a geo-fence server, the mobile geo-fence corresponding to a mobile device. In an embodiment, the geo-fence server is a cloud-based service. In various embodiments, the mobile geo-fence is a polygonal shape, a circular shape, or a three-dimensional shape.

In an embodiment, the method 800 includes receiving a registration of the mobile geo-fence (e.g., when a user first begins using the mobile device), the registration including geo-fence parameters. In a further embodiment, the geo-fence parameters include a geo-fence shape and size. In a further embodiment, the geo-fence parameters include an identity of a user of the mobile device.

At 804, an intersection of the mobile geo-fence with a second geo-fence is detected. In an embodiment, detecting the intersection of the mobile geo-fence with the second geo-fence further comprises identifying a boundary of the mobile geo-fence, identifying a boundary of the second geo-fence, and determining whether the boundary of the mobile geo-fence overlaps at least a portion of the boundary of the second geo-fence. In a further embodiment, determining whether the boundary of the mobile geo-fence overlaps at least a portion of the boundary of the second geo-fence further comprises determining that the boundary of the mobile geo-fence overlaps at least a portion of the boundary of the second geo-fence without the mobile device being in the second geo-fence.

At 806, data is provided to the mobile device based on a data sharing policy. In an embodiment, the data is encrypted. In an embodiment, providing data to the mobile device further comprises determining an identity of a user of the mobile device, determining an identity associated with the second geo-fence, and accessing the data sharing policy that links the identity of the user with the identity associated with the second geo-fence.

In an embodiment, the second geo-fence is that of a patient, and providing data to the mobile device further comprises accessing an electronic medical records database, identifying patient data of the patient associated with the second geo-fence, and providing the patient data to the mobile device. In a further embodiment, the method 800 includes receiving data from the mobile device and communicating the data to the electronic medical records database for storage.

In an embodiment, the method 800 includes transmitting a trigger action that erases the data from the mobile device after detecting that the mobile geo-fence and the second geo-fence no longer intersect.

In an embodiment, the second geo-fence is a stationary geo-fence. In a further embodiment, the second geo-fence is associated with a room in a building.

In an embodiment, providing data to the mobile device based on the data sharing policy comprises determining a state of progress in a process of a user of the mobile device and loading data to the mobile device from the geo-fence server based on the state. In a further embodiment, the process is a medical treatment and wherein the state of progress is a stage in the medical treatment. In a further embodiment, the stage of the medical evaluation comprises a laboratory test stage. In an embodiment, the stage of the medical evaluation comprises a diagnostic stage. In an embodiment, the stage of the medical evaluation comprises a physical examination stage. In an embodiment, the stage of the medical evaluation comprises a surgical operation stage.

In a further embodiment, the method includes providing information to a device corresponding to the second geo-fence, the second geo-fence defined in part by being centered on the device, the information related to a user of the mobile device. In a further embodiment, the information is related to a medical treatment being provided by a clinician, the clinician being the user of the mobile device. In a further embodiment, the information comprises patient chart data.

In embodiments, the second geo-fence is a polygonal shape, a circular shape, or a three-dimensional shape.

Embodiments may be implemented in one or a combination of hardware, firmware, and software. Embodiments may also be implemented as instructions stored on a machine-readable storage device, which may be read and executed by at least one processor to perform the operations described herein. A machine-readable storage device may include any non-transitory mechanism for storing information in a form readable by a machine (e.g., a computer). For example, a machine-readable storage device may include read-only memory (ROM), random-access memory (RAM), magnetic disk storage media, optical storage media, flash-memory devices, and other storage devices and media.

Examples, as described herein, may include, or may operate on, logic or a number of components, modules, or mechanisms. Modules may be hardware, software, or firmware communicatively coupled to one or more processors in order to carry out the operations described herein. Modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software; the general-purpose hardware processor may be configured as respective different modules at different times.

Software may accordingly configure a hardware processor, for example, to constitute a particular module at one instance of time and to constitute a different module at a different instance of time. Modules may also be software or firmware modules, which operate to perform the methodologies described herein.

Figure 9:
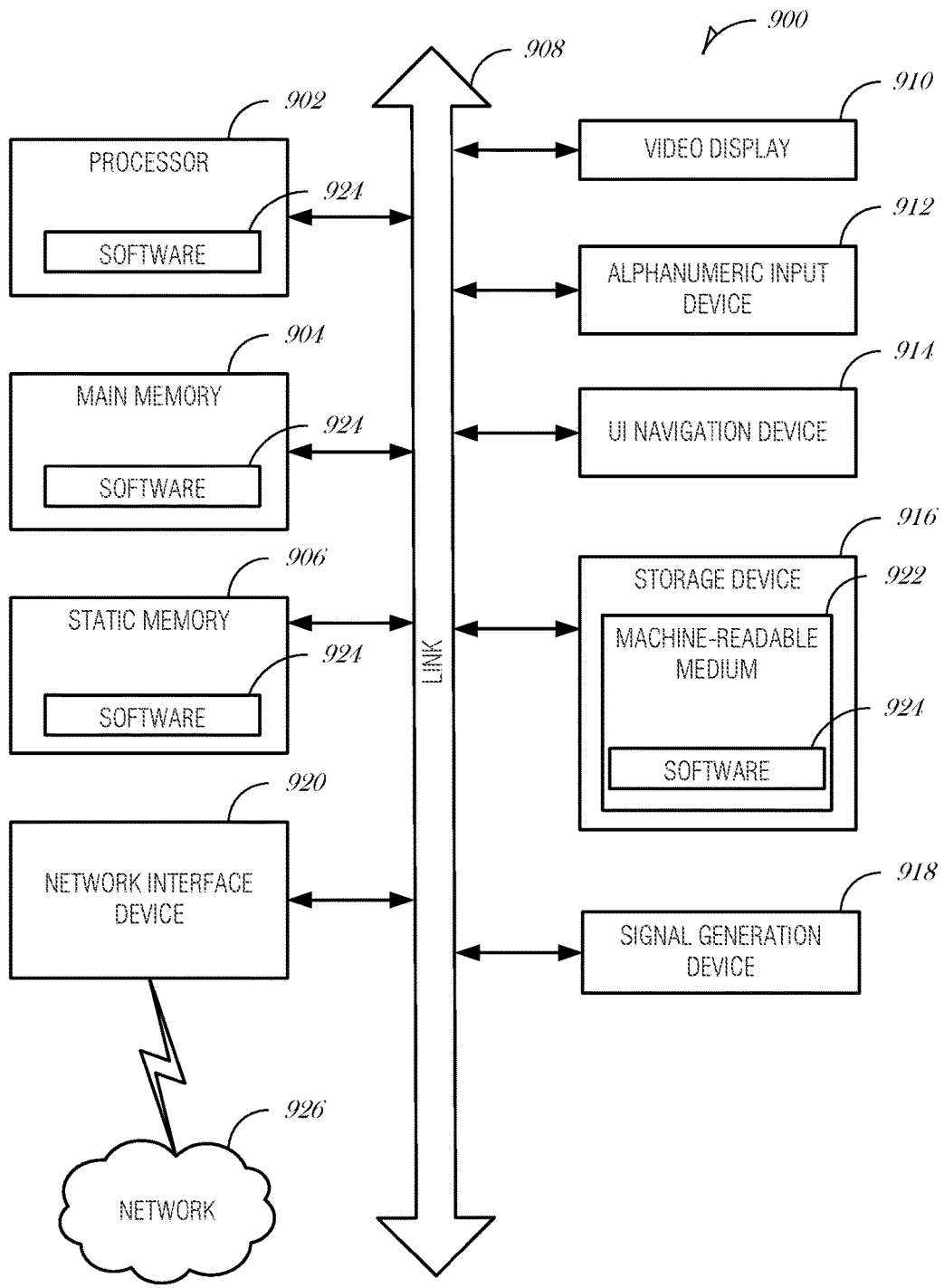
FIG. 9 is a block diagram illustrating an example machine upon which any one or more of the techniques (e.g., methodologies) discussed herein may perform, according to an example embodiment.

FIG. 9 is a block diagram illustrating a machine in the example form of a computer system 900, within which a set or sequence of instructions may be executed to cause the machine to perform any one of the methodologies discussed herein, according to an example embodiment. In alternative embodiments, the machine operates as a standalone device or may be connected (e.g., networked) to other machines. In a networked deployment, the machine may operate in the capacity of either a server or a client machine in server-client network environments, or it may act as a peer machine in peer-to-peer (or distributed) network environments. The machine may be an onboard vehicle system, set-top box, wearable device, personal computer (PC), a tablet PC, a hybrid tablet, a personal digital assistant (PDA), a mobile telephone, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. Similarly, the term "processor-based system" shall be taken to include any set of one or more machines that are controlled by or operated by a processor (e.g., a computer) to individually or jointly execute instructions to perform any one or more of the methodologies discussed herein.

Example computer system 900 includes at least one processor 902 (e.g., a central processing unit (CPU), a graphics processing unit (GPU) or both, processor cores, compute nodes, etc.), a main memory 904 and a static memory 906, which communicate with each other via a link 908 (e.g., bus). The computer system 900 may further include a video display unit 910, an alphanumeric input device 912 (e.g., a keyboard), and a user interface (UI) navigation device 914 (e.g., a mouse). In one embodiment, the video display unit 910, input device 912 and UI navigation device 914 are incorporated into a touch screen display. The computer system 900 may additionally include a storage device 916 (e.g., a drive unit), a signal generation device 918 (e.g., a speaker), a network interface device 920, and one or more sensors (not shown), such as a global positioning system (GPS) sensor, compass, accelerometer, or other sensor.

The storage device 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904, static memory 906, and/or within the processor 902 during execution thereof by the computer system 900, with the main memory 904, static memory 906, and the processor 902 also constituting machine-readable media.

While the machine-readable medium 922 is illustrated in an example embodiment to be a single medium, the term "machine-readable medium" may include a single medium or multiple media (e.g., a centralized or distributed database, and/or associated caches and servers) that store the one or more instructions 924. The term "machine-readable medium" shall also be taken to include any tangible medium that is capable of storing, encoding or carrying instructions for execution by the machine and that cause the machine to perform any one or more of the methodologies of the present disclosure or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of well-known transfer protocols (e.g., HTTP). Examples of communication networks include a local area network (LAN), a wide area network (WAN), the Internet, mobile telephone networks, plain old telephone (POTS) networks, and wireless data networks (e.g., Wi-Fi, 3G, and 4G LTE/LTE-A or WiMAX networks). The term "transmission medium" shall be taken to include any intangible medium that is capable of storing, encoding, or carrying instructions for execution by the machine, and includes digital or analog communications signals or other intangible medium to facilitate communication of such software.

Additional Notes & Examples

Example 1 includes subject matter for managing mobile geo-fences (such as a device, apparatus, or machine) comprising: a tracking module to track a mobile geo-fence, the mobile geo-fence corresponding to a mobile device; a detection module to detect an intersection of the mobile geo-fence with a second geo-fence; and a data transmission module to provide data to the mobile device based on a data sharing policy.

In Example 2, the subject matter of Example 1 may include, wherein the system is a cloud-based service.

In Example 3, the subject matter of any one of Examples 1 to 2 may include, wherein the mobile geo-fence is a polygonal shape, a circular shape, or a three-dimensional shape.

In Example 4, the subject matter of any one of Examples 1 to 3 may include, a registration module to receive a registration of the mobile geo-fence, the registration geo-fence parameters.

In Example 5, the subject matter of any one of Examples 1 to 4 may include, wherein the geo-fence parameters include a geo-fence shape and size.

In Example 6, the subject matter of any one of Examples 1 to 5 may include, wherein the geo-fence parameters include an identity of a user of the mobile device.

In Example 7, the subject matter of any one of Examples 1 to 6 may include, wherein to detect the intersection of the mobile geo-fence with the second geo-fence, the detection module is to: identify a boundary of the mobile geo-fence; identify a boundary of the second geo-fence; and determine whether the boundary of the mobile geo-fence overlaps at least a portion of the boundary of the second geo-fence.

In Example 8, the subject matter of any one of Examples 1 to 7 may include, wherein to determine whether the boundary of the mobile geo-fence overlaps at least a portion of the boundary of the second geo-fence, the detection module is to: determine that the boundary of the mobile geo-fence overlaps at least a portion of the boundary of the second geo-fence without the mobile device being in the second geo-fence.

In Example 9, the subject matter of any one of Examples 1 to 8 may include, wherein to provide data to the mobile device, the data transmission module is to: determine an identity of a user of the mobile device; determine an identity associated with the second geo-fence; and access the data sharing policy that links the identity of the user with the identity associated with the second geo-fence.

In Example 10, the subject matter of any one of Examples 1 to 9 may include, wherein the second geo-fence is that of a patient, and wherein to provide data to the mobile device, the data transmission module is to: access an electronic medical records database; identify patient data of the patient associated with the second geo-fence; and provide the patient data to the mobile device.

In Example 11, the subject matter of any one of Examples 1 to 10 may include, a data storage module to: receive data from the mobile device; and communicate the data to the electronic medical records database for storage.

In Example 12, the subject matter of any one of Examples 1 to 11 may include, a data deletion module to: transmit a trigger action that erases the data from the mobile device after detecting that the mobile geo-fence and the second geo-fence no longer intersect.

In Example 13, the subject matter of any one of Examples 1 to 12 may include, wherein the data is encrypted.

In Example 14, the subject matter of any one of Examples 1 to 13 may include, wherein the second geo-fence is a stationary geo-fence.

In Example 15, the subject matter of any one of Examples 1 to 14 may include, wherein the second geo-fence is associated with a room in a building.

In Example 16, the subject matter of any one of Examples 1 to 15 may include, wherein to provide data to the mobile device based on the data sharing policy, the data transmission module is to: determine a state of progress in a process of a user of the mobile device; and load data to the mobile device from the geo-fence server based on the state.

In Example 17, the subject matter of any one of Examples 1 to 16 may include, wherein the process is a medical treatment and wherein the state of progress is a stage in the medical treatment.

In Example 18, the subject matter of any one of Examples 1 to 17 may include, wherein the stage of the medical evaluation comprises a laboratory test stage.

In Example 19, the subject matter of any one of Examples 1 to 18 may include, wherein the stage of the medical evaluation comprises a diagnostic stage.

In Example 20, the subject matter of any one of Examples 1 to 19 may include, wherein the stage of the medical evaluation comprises a physical examination stage.

In Example 21, the subject matter of any one of Examples 1 to 20 may include, wherein the stage of the medical evaluation comprises a surgical operation stage.

In Example 22, the subject matter of any one of Examples 1 to 21 may include, a data sharing module to: provide information to a device corresponding to the second geo-fence, the second geo-fence defined in part by being centered on the device, the information related to a user of the mobile device.

In Example 23, the subject matter of any one of Examples 1 to 22 may include, wherein the information is related to a medical treatment being provided by a clinician, the clinician being the user of the mobile device.

In Example 24, the subject matter of any one of Examples 1 to 23 may include, wherein the information comprises patient chart data.

In Example 25, the subject matter of any one of Examples 1 to 24 may include, wherein the second geo-fence is a polygonal shape, a circular shape, or a three-dimensional shape.

Example 26 includes subject matter for managing mobile geo-fences (such as a method, means for performing acts, machine readable medium including instructions that when performed by a machine cause the machine to performs acts, or an apparatus to perform) comprising: tracking, at a geo-fence server, a mobile geo-fence, the mobile geo-fence corresponding to a mobile device; detecting an intersection of the mobile geo-fence with a second geo-fence; and providing data to the mobile device based on a data sharing policy.

In Example 27, the subject matter of Example 26 may include, wherein the geo-fence server is a cloud-based service.

In Example 28, the subject matter of any one of Examples 26 to 27 may include, wherein the mobile geo-fence is a polygonal shape, a circular shape, or a three-dimensional shape.

In Example 29, the subject matter of any one of Examples 26 to 28 may include, receiving a registration of the mobile geo-fence, the registration geo-fence parameters.

In Example 30, the subject matter of any one of Examples 26 to 29 may include, wherein the geo-fence parameters include a geo-fence shape and size.

In Example 31, the subject matter of any one of Examples 26 to 30 may include, wherein the geo-fence parameters include an identity of a user of the mobile device.

In Example 32, the subject matter of any one of Examples 26 to 31 may include, wherein detecting the intersection of the mobile geo-fence with the second geo-fence comprises: identifying a boundary of the mobile geo-fence; identifying a boundary of the second geo-fence; and determining whether the boundary of the mobile geo-fence overlaps at least a portion of the boundary of the second geo-fence.

In Example 33, the subject matter of any one of Examples 26 to 32 may include, wherein determining whether the boundary of the mobile geo-fence overlaps at least a portion of the boundary of the second geo-fence comprises: determining that the boundary of the mobile geo-fence overlaps at least a portion of the boundary of the second geo-fence without the mobile device being in the second geo-fence.

In Example 34, the subject matter of any one of Examples 26 to 33 may include, wherein providing data to the mobile device comprises: determining an identity of a user of the mobile device; determining an identity associated with the second geo-fence; and accessing the data sharing policy that links the identity of the user with the identity associated with the second geo-fence.

In Example 35, the subject matter of any one of Examples 26 to 34 may include, wherein the second geo-fence is that of a patient, and wherein providing data to the mobile device comprises: accessing an electronic medical records database; identifying patient data of the patient associated with the second geo-fence; and providing the patient data to the mobile device.

In Example 36, the subject matter of any one of Examples 26 to 35 may include, receiving data from the mobile device; and communicating the data to the electronic medical records database for storage.

In Example 37, the subject matter of any one of Examples 26 to 36 may include, transmitting a trigger action that erases the data from the mobile device after detecting that the mobile geo-fence and the second geo-fence no longer intersect.

In Example 38, the subject matter of any one of Examples 26 to 37 may include, wherein the data is encrypted.

In Example 39, the subject matter of any one of Examples 26 to 38 may include, wherein the second geo-fence is a stationary geo-fence.

In Example 40, the subject matter of any one of Examples 26 to 39 may include, wherein the second geo-fence is associated with a room in a building.

In Example 41, the subject matter of any one of Examples 26 to 40 may include, wherein providing data to the mobile device based on the data sharing policy comprises: determining a state of progress in a process of a user of the mobile device; and loading data to the mobile device from the geo-fence server based on the state.

In Example 42, the subject matter of any one of Examples 26 to 41 may include, wherein the process is a medical treatment and wherein the state of progress is a stage in the medical treatment.

In Example 43, the subject matter of any one of Examples 26 to 42 may include, wherein the stage of the medical evaluation comprises a laboratory test stage.

In Example 44, the subject matter of any one of Examples 26 to 43 may include, wherein the stage of the medical evaluation comprises a diagnostic stage.

In Example 45, the subject matter of any one of Examples 26 to 44 may include, wherein the stage of the medical evaluation comprises a physical examination stage.

In Example 46, the subject matter of any one of Examples 26 to 45 may include, wherein the stage of the medical evaluation comprises a surgical operation stage.

In Example 47, the subject matter of any one of Examples 26 to 46 may include, providing information to a device corresponding to the second geo-fence, the second geo-fence defined in part by being centered on the device, the information related to a user of the mobile device.

In Example 48, the subject matter of any one of Examples 26 to 47 may include, wherein the information is related to a medical treatment being provided by a clinician, the clinician being the user of the mobile device.

In Example 49, the subject matter of any one of Examples 26 to 48 may include, wherein the information comprises patient chart data.

In Example 50, the subject matter of any one of Examples 26 to 49 may include, wherein the second geo-fence is a polygonal shape, a circular shape, or a three-dimensional shape.

Example 51 includes an apparatus comprising means for performing any of the Examples 26-50.

Example 52 includes at least one machine-readable medium including instructions, which when executed by a machine, cause the machine to perform operations of any of the Examples 26-50.

Example 53 includes subject matter for managing mobile geo-fences (such as a device, apparatus, or machine) comprising: means for tracking, at a geo-fence server, a mobile geo-fence, the mobile geo-fence corresponding to a mobile device; means for detecting an intersection of the mobile geo-fence with a second geo-fence; and means for providing data to the mobile device based on a data sharing policy.

In Example 54, the subject matter of Example 53 may include, wherein the geo-fence server is a cloud-based service.

In Example 55, the subject matter of any one of Examples 53 to 54 may include, wherein the mobile geo-fence is a polygonal shape, a circular shape, or a three-dimensional shape.

In Example 56, the subject matter of any one of Examples 53 to 55 may include, means for receiving a registration of the mobile geo-fence, the registration geo-fence parameters.

In Example 57, the subject matter of any one of Examples 53 to 56 may include, wherein the geo-fence parameters include a geo-fence shape and size.

In Example 58, the subject matter of any one of Examples 53 to 57 may include, wherein the geo-fence parameters include an identity of a user of the mobile device.

In Example 59, the subject matter of any one of Examples 53 to 58 may include, wherein the means for detecting the intersection of the mobile geo-fence with the second geo-fence comprise: means for identifying a boundary of the mobile geo-fence; means for identifying a boundary of the second geo-fence; and means for determining whether the boundary of the mobile geo-fence overlaps at least a portion of the boundary of the second geo-fence.

In Example 60, the subject matter of any one of Examples 53 to 59 may include, wherein the means for determining whether the boundary of the mobile geo-fence overlaps at least a portion of the boundary of the second geo-fence comprise: means for determining that the boundary of the mobile geo-fence overlaps at least a portion of the boundary of the second geo-fence without the mobile device being in the second geo-fence.

In Example 61, the subject matter of any one of Examples 53 to 60 may include, wherein the means for providing data to the mobile device comprise: means for determining an identity of a user of the mobile device; means for determining an identity associated with the second geo-fence; and means for accessing the data sharing policy that links the identity of the user with the identity associated with the second geo-fence.

In Example 62, the subject matter of any one of Examples 53 to 61 may include, wherein the second geo-fence is that of a patient, and wherein the means for providing data to the mobile device comprise: means for accessing an electronic medical records database; means for identifying patient data of the patient associated with the second geo-fence; and means for providing the patient data to the mobile device.

In Example 63, the subject matter of any one of Examples 53 to 62 may include, means for receiving data from the mobile device; and means for communicating the data to the electronic medical records database for storage.

In Example 64, the subject matter of any one of Examples 53 to 63 may include, means for transmitting a trigger action that erases the data from the mobile device after detecting that the mobile geo-fence and the second geo-fence no longer intersect.

In Example 65, the subject matter of any one of Examples 53 to 64 may include, wherein the data is encrypted.

In Example 66, the subject matter of any one of Examples 53 to 65 may include, wherein the second geo-fence is a stationary geo-fence.

In Example 67, the subject matter of any one of Examples 53 to 66 may include, wherein the second geo-fence is associated with a room in a building.

In Example 68, the subject matter of any one of Examples 53 to 67 may include, wherein the means for providing data to the mobile device based on the data sharing policy comprise: means for determining a state of progress in a process of a user of the mobile device; and means for loading data to the mobile device from the geo-fence server based on the state.

In Example 69, the subject matter of any one of Examples 53 to 68 may include, wherein the process is a medical treatment and wherein the state of progress is a stage in the medical treatment.

In Example 70, the subject matter of any one of Examples 53 to 69 may include, wherein the stage of the medical evaluation comprises a laboratory test stage.

In Example 71, the subject matter of any one of Examples 53 to 70 may include, wherein the stage of the medical evaluation comprises a diagnostic stage.

In Example 72, the subject matter of any one of Examples 53 to 71 may include, wherein the stage of the medical evaluation comprises a physical examination stage.

In Example 73, the subject matter of any one of Examples 53 to 72 may include, wherein the stage of the medical evaluation comprises a surgical operation stage.

In Example 74, the subject matter of any one of Examples 53 to 73 may include, means for providing information to a device corresponding to the second geo-fence, the second geo-fence defined in part by being centered on the device, the information related to a user of the mobile device.

In Example 75, the subject matter of any one of Examples 53 to 74 may include, wherein the information is related to a medical treatment being provided by a clinician, the clinician being the user of the mobile device.

In Example 76, the subject matter of any one of Examples 53 to 75 may include, wherein the information comprises patient chart data.

In Example 77, the subject matter of any one of Examples 53 to 76 may include, wherein the second geo-fence is a polygonal shape, a circular shape, or a three-dimensional shape.

Example 78 includes subject matter for managing mobile geo-fences (such as a device, apparatus, or machine) comprising: a processor subsystem; and a memory including instructions, which when executed by the processor subsystem, cause the processor subsystem to perform the operations comprising: tracking a mobile geo-fence, the mobile geo-fence corresponding to a mobile device; detecting an intersection of the mobile geo-fence with a second geo-fence; and providing data to the mobile device based on a data sharing policy.

In Example 79, the subject matter of Example 78 may include, wherein the system is a cloud-based service.

In Example 80, the subject matter of any one of Examples 78 to 79 may include, wherein the mobile geo-fence is a polygonal shape, a circular shape, or a three-dimensional shape.

In Example 81, the subject matter of any one of Examples 78 to 80 may include, instructions for receiving a registration of the mobile geo-fence, the registration geo-fence parameters.

In Example 82, the subject matter of any one of Examples 78 to 81 may include, wherein the geo-fence parameters include a geo-fence shape and size.

In Example 83, the subject matter of any one of Examples 78 to 82 may include, wherein the geo-fence parameters include an identity of a user of the mobile device.

In Example 84, the subject matter of any one of Examples 78 to 83 may include, wherein the instructions for detecting the intersection of the mobile geo-fence with the second geo-fence comprise instructions for: identifying a boundary of the mobile geo-fence; identifying a boundary of the second geo-fence; and determining whether the boundary of the mobile geo-fence overlaps at least a portion of the boundary of the second geo-fence.

In Example 85, the subject matter of any one of Examples 78 to 84 may include, wherein the instructions for determining whether the boundary of the mobile geo-fence overlaps at least a portion of the boundary of the second geo-fence comprise instructions for: determining that the boundary of the mobile geo-fence overlaps at least a portion of the boundary of the second geo-fence without the mobile device being in the second geo-fence.

In Example 86, the subject matter of any one of Examples 78 to 85 may include, wherein the instructions for providing data to the mobile device comprises instructions for: determining an identity of a user of the mobile device; determining an identity associated with the second geo-fence; and accessing the data sharing policy that links the identity of the user with the identity associated with the second geo-fence.

In Example 87, the subject matter of any one of Examples 78 to 86 may include, wherein the second geo-fence is that of a patient, and wherein the instructions for providing data to the mobile device comprises instructions for: accessing an electronic medical records database; identifying patient data of the patient associated with the second geo-fence; and providing the patient data to the mobile device.

In Example 88, the subject matter of any one of Examples 78 to 87 may include, instructions for: receiving data from the mobile device; and communicating the data to the electronic medical records database for storage.

In Example 89, the subject matter of any one of Examples 78 to 88 may include, instructions for: transmitting a trigger action that erases the data from the mobile device after detecting that the mobile geo-fence and the second geo-fence no longer intersect.

In Example 90, the subject matter of any one of Examples 78 to 89 may include, wherein the data is encrypted.

In Example 91, the subject matter of any one of Examples 78 to 90 may include, wherein the second geo-fence is a stationary geo-fence.

In Example 92, the subject matter of any one of Examples 78 to 91 may include, wherein the second geo-fence is associated with a room in a building.

In Example 93, the subject matter of any one of Examples 78 to 92 may include, wherein the instructions for providing data to the mobile device based on the data sharing policy comprise instructions for: determining a state of progress in a process of a user of the mobile device; and loading data to the mobile device from the geo-fence server based on the state.

In Example 94, the subject matter of any one of Examples 78 to 93 may include, wherein the process is a medical treatment and wherein the state of progress is a stage in the medical treatment.

In Example 95, the subject matter of any one of Examples 78 to 94 may include, wherein the stage of the medical evaluation comprises a laboratory test stage.

In Example 96, the subject matter of any one of Examples 78 to 95 may include, wherein the stage of the medical evaluation comprises a diagnostic stage.

In Example 97, the subject matter of any one of Examples 78 to 96 may include, wherein the stage of the medical evaluation comprises a physical examination stage.

In Example 98, the subject matter of any one of Examples 78 to 97 may include, wherein the stage of the medical evaluation comprises a surgical operation stage.

In Example 99, the subject matter of any one of Examples 78 to 98 may include, instructions for: providing information to a device corresponding to the second geo-fence, the second geo-fence defined in part by being centered on the device, the information related to a user of the mobile device.

In Example 100, the subject matter of any one of Examples 78 to 99 may include, wherein the information is related to a medical treatment being provided by a clinician, the clinician being the user of the mobile device.

In Example 101, the subject matter of any one of Examples 78 to 100 may include, wherein the information comprises patient chart data.

In Example 102, the subject matter of any one of Examples 78 to 101 may include, wherein the second geo-fence is a polygonal shape, a circular shape, or a three-dimensional shape.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

What is claimed is:

1. A system comprising:
    a tracker to track a geo-fence comprising an area about a mobile device of a first user;
    a detector to detect an intersection of the geo-fence with a second geo-fence associated with a second user; and
    a data transmitter, in response to detection of the intersection, to provide content from the system to the mobile device based on a data sharing policy comprising a paired identity that links an identity of the first user with an identity associated with the second geo-fence.

2. The system of claim 1, wherein the geo-fence is a polygonal shape, a circular shape, or a three-dimensional shape.

3. The system of claim 1, wherein the geo-fence comprises a mobile geo-fence.

4. The system of claim 1, wherein the geo-fence is centered on the mobile device.

5. The system of claim 4, wherein the geo-fence parameters include the identity of the first user of the mobile device.

6. The system of claim 1, further comprising a registration hardware module to receive a registration of the mobile geo-fence, the registration including geo-fence parameters.

7. The system of claim 1, wherein the system comprises a remote server.

8. The system of claim 7, wherein the remote server comprises a cloud-based service.

9. The system of claim 8, wherein the system further comprises a receiver to receive information from the mobile device regarding an event in the geo-fence, store the information in a cloud storage, and provide the information to at least another device in the geo-fence.

10. The system of claim 1, wherein the detector is to detect the intersection based on a second device of the second user.

11. The system of claim 10, wherein the system is to provide a notification to the mobile device when the second device enters the geo-fence.

12. The system of claim 11, wherein the notification comprises a push notification.

13. The system of claim 11, wherein the notification comprises a query.

14. The system of claim 1, wherein the system is to receive the content from the second user, the content comprising at least one of audio and visual data.

15. At least one non-transitory machine-readable medium including instructions, which when executed by a machine, cause the machine to:
    track, at a first server, a geo-fence, the geo-fence corresponding to a mobile device of a first user;
    detect an intersection of the geo-fence with a second geo-fence associated with a second user, wherein the first server tracks the second geo-fence via a second device associated with the second user;
    in response to detection of the intersection, provide content associated with the second user to the mobile device based on a data sharing policy comprising a paired identity that links an identity of the first user with an identity associated with the second geo-fence.

16. The at least one non-transitory machine-readable medium of claim 15, further comprising instructions to:
  access an electronic medical records database;
  identify patient data of the second user comprising a patient associated with the second geo-fence; and
  provide the patient data to the mobile device.

17. The at least one non-transitory machine-readable medium of claim 16, further comprising instructions to:
  receive second data from the mobile device; and
  communicate the second data to the electronic medical records database for storage.

18. A method comprising:
  tracking, at a first server, a geo-fence, the geo-fence corresponding to a mobile device of a first user;
  detecting an intersection of the geo-fence with a second geo-fence associated with a second user, wherein the first server tracks the second geo-fence via a second device associated with the second user; and
  in response to detecting the intersection, providing content associated with the second user to the mobile device based on a data sharing policy comprising a paired identity that links an identity of the first user with an identity associated with the second geo-fence.

19. The method of claim 18, further comprising:
  accessing an electronic medical records database;
  identifying patient data of the second user comprising a patient associated with the second geo-fence; and
  providing the patient data to the mobile device.

\* \* \* \* \*